Figure 1:
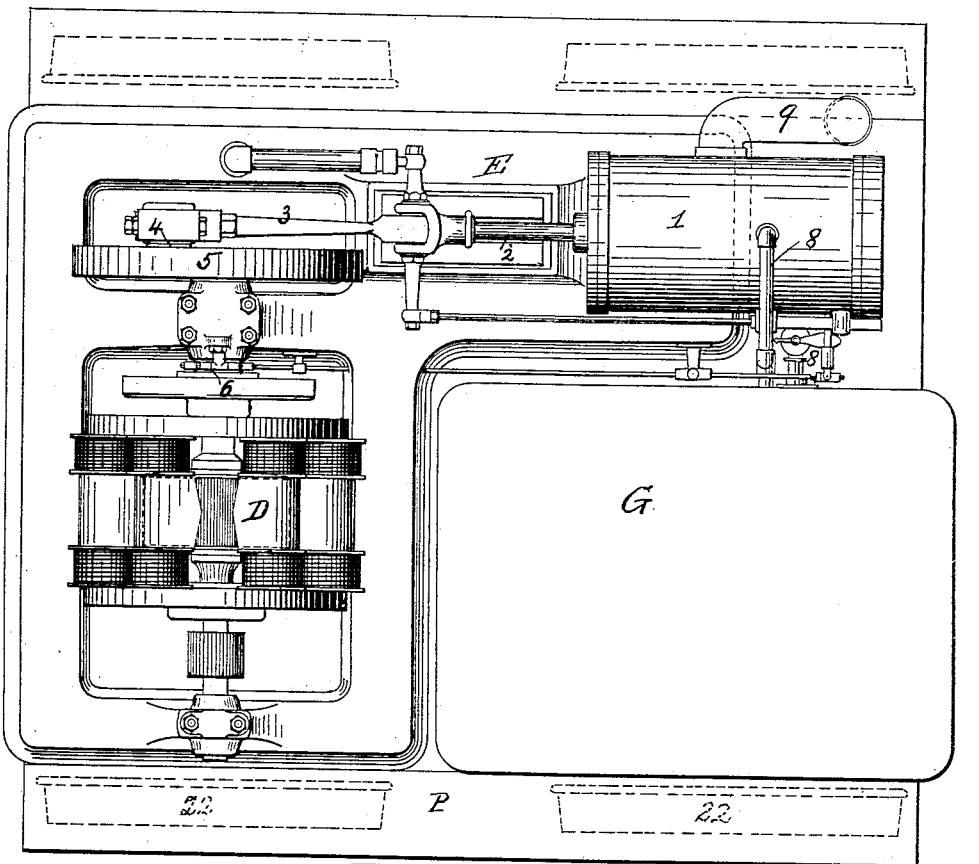

(No Model.) 5 Sheets—Sheet 1.

C. S. BRADLEY.
ELECTRIC RAILWAY SYSTEM.

No. 399,372. Patented Mar. 12, 1889.

WITNESSES:
J. C. Spaeth
Emile Henkel

INVENTOR,
Charles S. Bradley
BY
M. Tigher Worthington
ATTORNEYS.

(No Model.) 5 Sheets—Sheet 2.

C. S. BRADLEY.
ELECTRIC RAILWAY SYSTEM.

No. 399,372. Patented Mar. 12, 1889.

(No Model.) 5 Sheets—Sheet 3.

C. S. BRADLEY.
ELECTRIC RAILWAY SYSTEM.

No. 399,372. Patented Mar. 12, 1889.

(No Model.) 5 Sheets—Sheet 4.

C. S. BRADLEY.
ELECTRIC RAILWAY SYSTEM.

No. 399,372. Patented Mar. 12, 1889.

WITNESSES:
Emile Henkel

Charles S. Bradley, INVENTOR,

BY
McTighe & Worthington
ATTORNEY (No Model.) 5 Sheets—Sheet 5.

C. S. BRADLEY.
ELECTRIC RAILWAY SYSTEM.

No. 399,372. Patented Mar. 12, 1889.

WITNESSES:
J. L. Spaeth.
E. L. Myers

Charles S. Bradley, INVENTOR,

BY
W. Tighe Worthington
ATTORNEYS.

UNITED STATES PATENT OFFICE.

CHARLES S. BRADLEY, OF YONKERS, NEW YORK.

ELECTRIC-RAILWAY SYSTEM.

SPECIFICATION forming part of Letters Patent No. 399,372, dated March 12, 1889.

Application filed August 8, 1888. Serial No. 282,286. (No model.)

*To all whom it may concern:*

Be it known that I, CHARLES S. BRADLEY, a citizen of the United States, residing at Yonkers, in the county of Westchester and State of New York, have invented certain new and useful Improvements in Electric-Railway Systems; and I do hereby declare the following to be a full, clear, and exact description of the invention, such as will enable others skilled in the art to which it appertains to make and use the same.

This invention relates to the electric propulsion of vehicles—such as street or tramway, passenger, or freight cars—on railway-lines; and it consists in the arrangement and combination of devices and instrumentalities, substantially as hereinafter fully described and claimed.

Heretofore three principal methods have been proposed for the application of electrical energy to the propulsion of railway-vehicles: First, it has been proposed to use a stationary electric generator driven by some form of prime mover—such as a steam-engine or water-wheel—place an electric motor on the vehicle arranged to propel the latter, the current being conveyed from the generator to the motor on the vehicle by means of overhead conductors, the motor having traveling connections; second, it has been proposed to convey the current by means of conductors variously arranged in underground conduits, from which intermittent or continuous connection was made with the motor on the car, and, third, it has been proposed to use a stationary generator suitably located, and place on the vehicle a motor and a storage-battery, the latter being charged at intervals by the stationary generator, either while on the vehicle or after dismounting from the latter, by means of a system of interchangeable batteries.

Various difficulties have been found to attend each of the foregoing methods and the different modifications of them which have from time to time been suggested.

It is my present purpose to avoid all difficulties—such as leakage of main conductors, loss of power in overcoming their resistance, intricacies of switching and regulating, loss of efficiency, and all the evils possible to their use, &c.; and to these ends I have devised arrangements by whose use the generation and utilization of current are effected on the spot, and thus stationary generators, main conductors, and storage-batteries are dispensed with, and perfect regulation, with maximum efficiency under variable loads and speeds, is rendered attainable.

More particularly my invention is as follows, reference being had to the accompanying drawings, which form part of this specification, in which—

Figure 4:
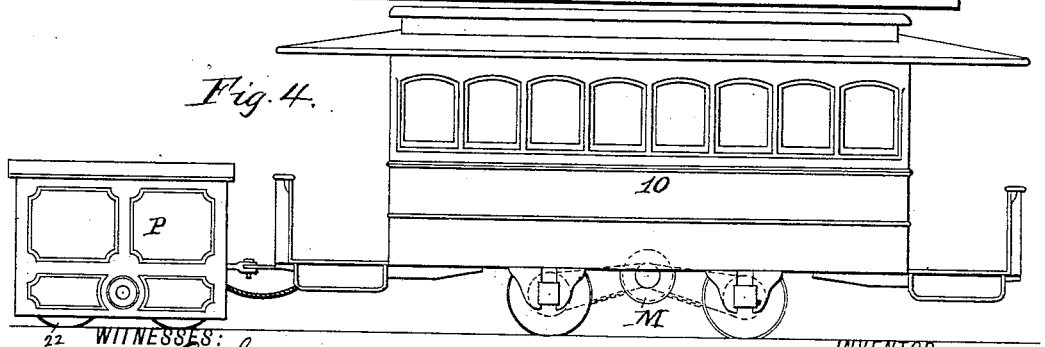
Figure 2:
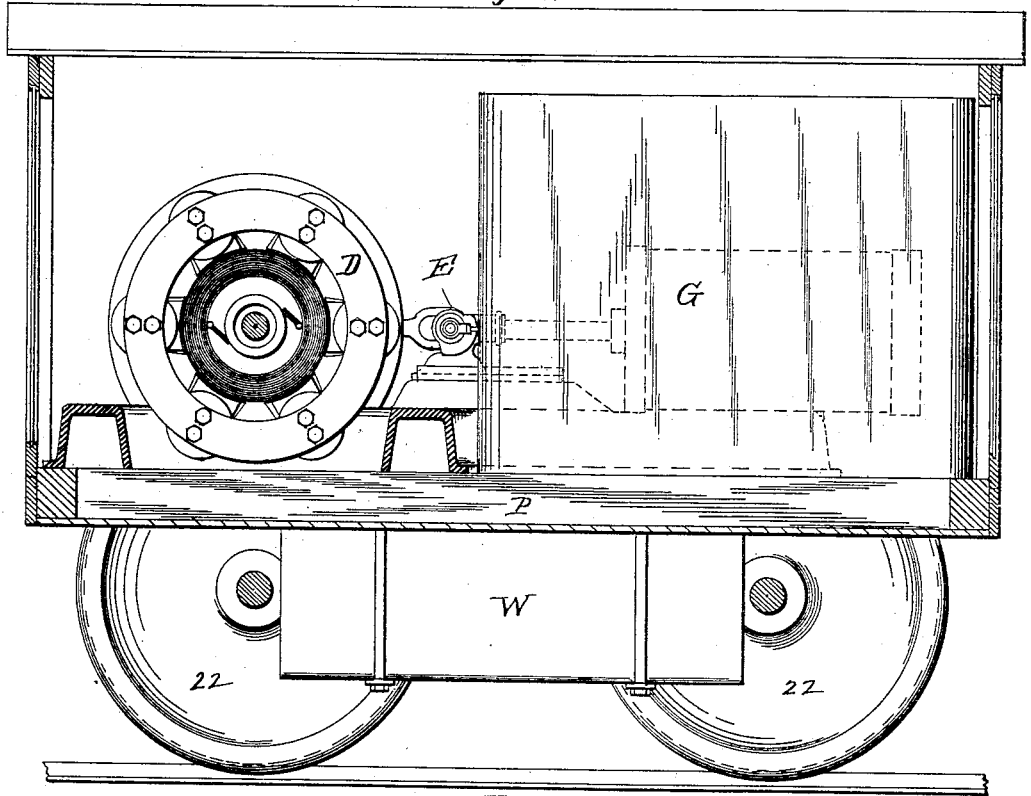
Figure 3:
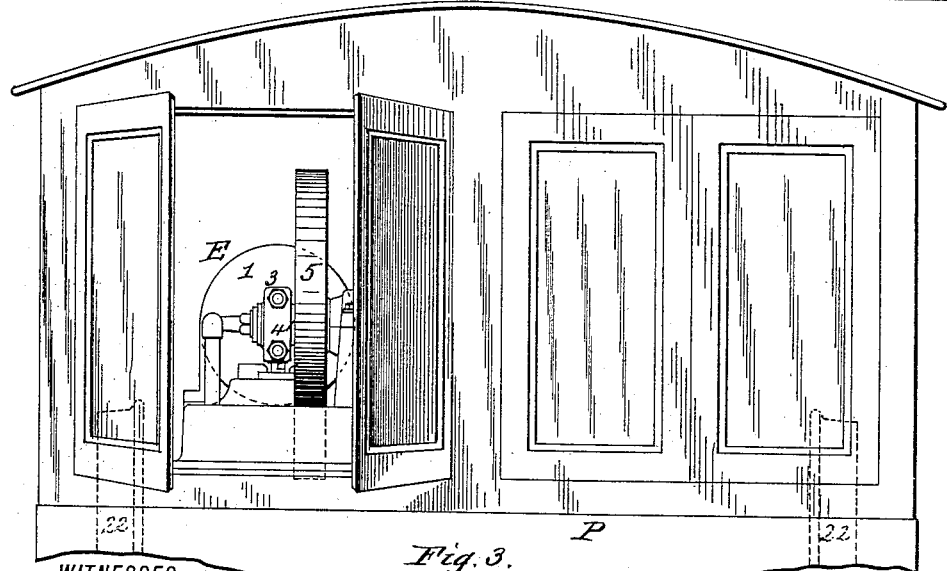
Figure 5:
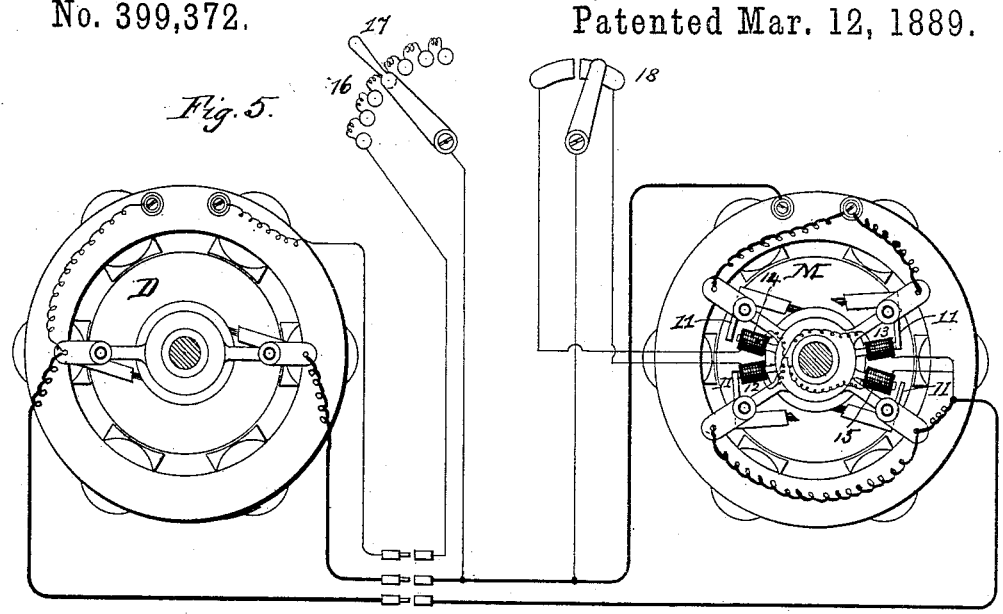
Figure 6:
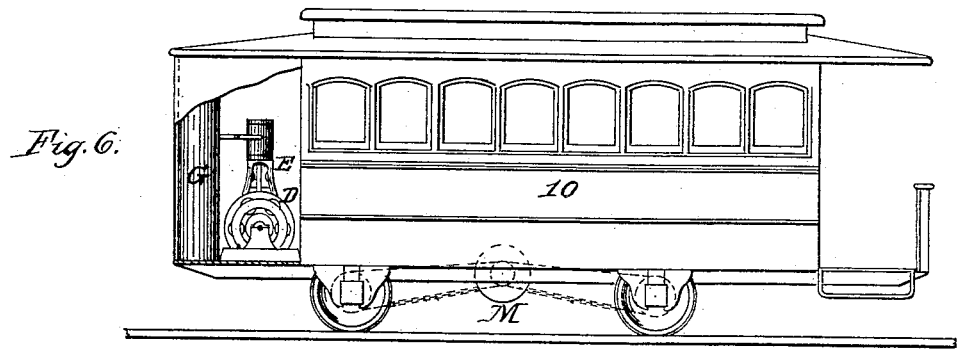
Figure 7:
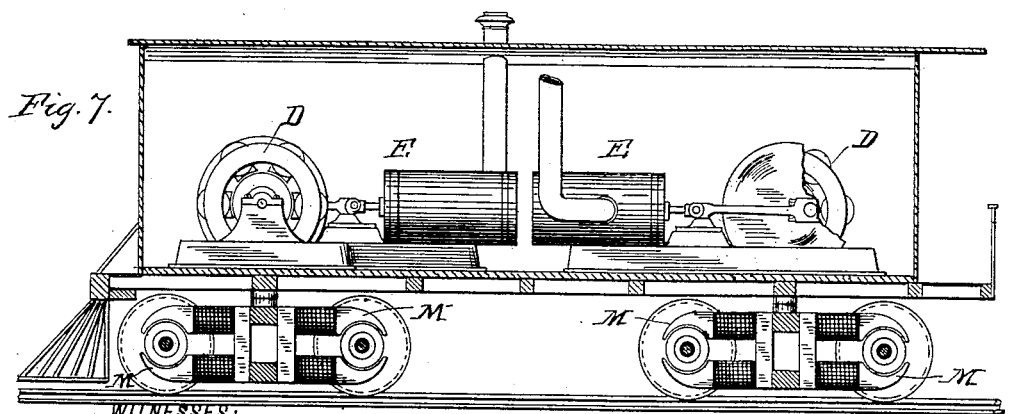
Figure 8:
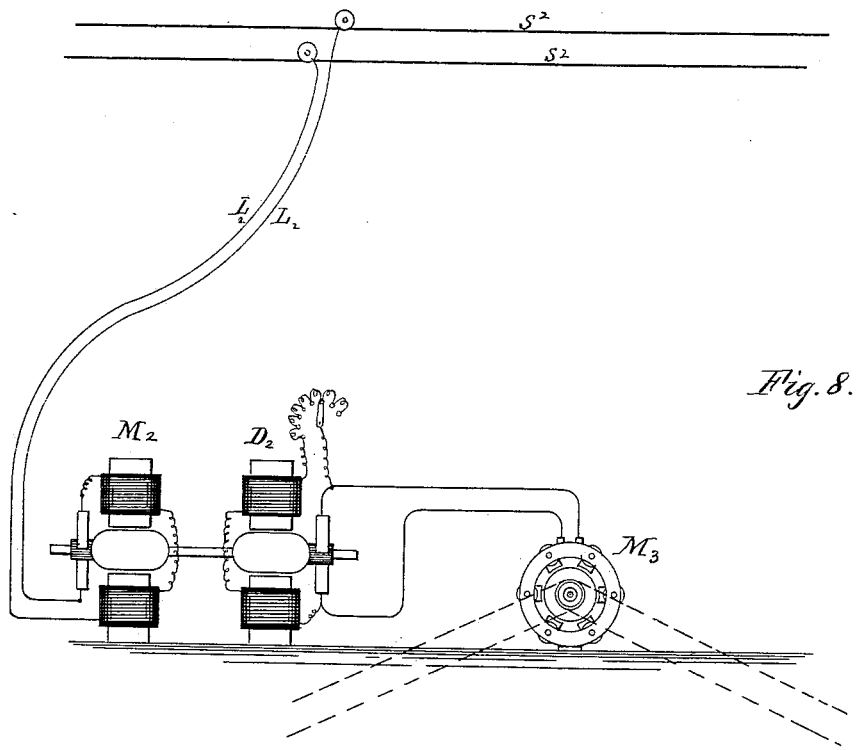
Figure 9:
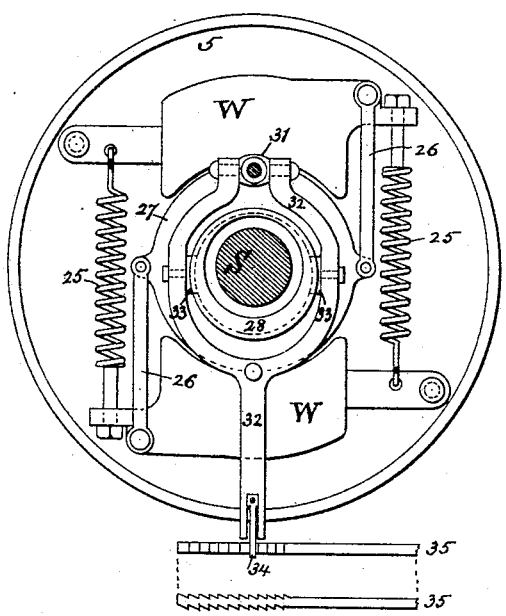
Figure 10:
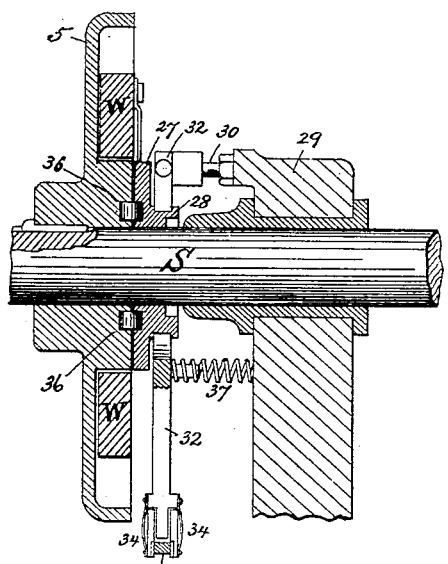
Figure 11:
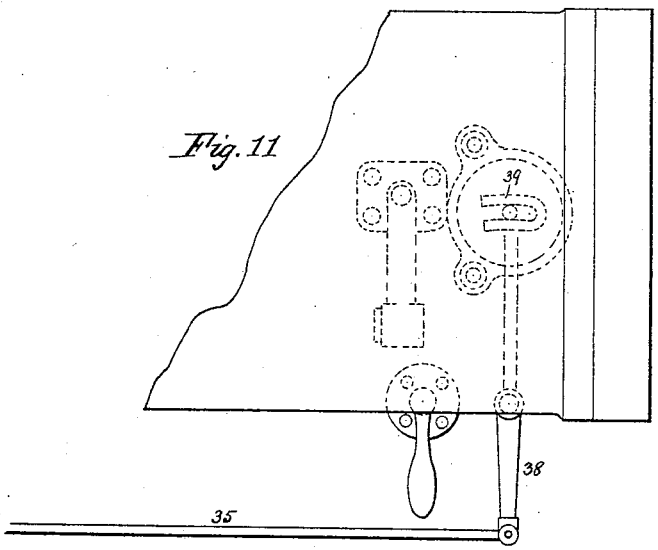
Figure 12:
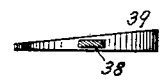

Figure 1 is a plan view, Fig. 2 a side elevation, partly sectional, and Fig. 3 an end elevation, of the portable generating plant. Fig. 4 is a side elevation of the same coupled to an ordinary street-car provided with an electric motor. Fig. 5 is a diagram indicative of the circuits and starting and stopping, reversing, and regulating devices in one simple form adapted to the purpose. Fig. 6 is a side elevation of a street-car with the prime mover and dynamo-electric generator located in a compartment at one end thereof. Fig. 7 is a longitudinal section of an electric locomotive with two prime movers and two dynamo-electric generators, and Fig. 8 is a modification showing an electric motor used as a prime mover. Fig. 9 is an enlarged elevation of the automatic governor contained in the disk 5 of Fig. 1. Fig. 10 is a longitudinal vertical section of the same. Fig. 11 is a plan view, on a larger scale than Fig. 1, of the cylinder of the engine and the arrangements governing the admission of gas controlled by the devices set forth in Figs. 9 and 10; and Fig. 12 is a side view of the valve-controlling wedge.

The arrangement may be that of Fig. 4, or that of Fig. 6, in which the generating-plant is placed on the car directly, after the manner of what is sometimes called a "dummy." In the former case the generating-plant or electric tender may either follow or precede the car or cars to which it is coupled.

I construct a small platform or car-body, P, which is supported by, for example, two pairs of wheels, 22, in the usual or any suitable manner. On this platform I place a gas-engine, E, and a dynamo-electric generator, D, which I prefer to couple directly together, the dynamo being designed for normal generation at the speed of the engine. On the platform P, I also place a gas tank or holder, G, and a water-tank, W. Both are suitably connected to the engine E, so as to provide a supply of gas for driving the engine and a supply of water with which to absorb the surplus heat from the cylinder of the engine.

The foregoing devices I prefer to protect from the weather by a suitable hood or cab, which may to advantage be provided with glass doors or windows for the purpose of admitting light and rendering inspection convenient. I prefer to suspend the water-tank under the platform between the wheels, so as to give more room above, and also enable me to construct the entire electric tender within the smallest possible compass.

The engine is supplied with gas from the tank or reservoir G by means of the feed-pipe 8, which is arranged, as shown, to enter the cylinder of the gas-engine. The exhaust of the engine is indicated at 9.

The type of gas-engine herein shown is that commercially known as the "Baldwin," having the cylinder 1, piston-rod 2, connecting-rod 3, crank 4, disk 5, and governor 6. This governor, similarly to the shaft-governor or automatic cut-off in a self-regulating steam-engine, according to the tendency of the increase or decrease of load to lower or raise the speed, acts responsively to increase or decrease the quantity of explosive mixture admitted to the cylinder at each stroke of the piston, thus causing the speed to be maintained practically constant; but the particular kind of gas-engine, and in fact the particular type of engine generally, is not of the essence of this invention, as the same is capable of application and successful use with any form of prime mover which is adapted to transportation and is portable in the manner required for my invention. For instance, the gas-engine might be replaced by any suitable or desirable type of steam-engine, whether of high or low speed, and the gas tank or reservoir would be replaced by a steam-boiler and furnace therefor. I wish, therefore, to state that throughout the body of this specification, and in the claims appended hereto, the words "prime mover" will mean any form or type of prime mover—such, for instance, as a steam-engine of either the reciprocating, oscillating, or rotating type—and it will equally include the different species of the general class known as "gas-engines," whether the same be operated by a fixed or manufactured gas stored in a tank carried with the engine or by a hydrocarbon vapor or gas generated, as required, by any suitable means carried along with the engine—such, for instance, as a small heater receiving its heat from the waste products of combustion in the driving-cylinder, which products would otherwise be carried off into the atmosphere, but under the above arrangement would be largely utilized in generating a suitable hydrocarbon gas from kerosene, gasoline, or other suitable hydrocarbon liquid.

As such various forms and types, both of steam-engine and gas-engine, are already well known and perfectly understood as to details of construction by engine-builders and others skilled in the art, it is unnecessary for me to go into any further details as to their form. It is sufficient to say that whatever type or form of prime mover may be adopted in any particular case it will always be arranged in operative connection with the dynamo-electric generator D, and will always be constructed to automatically regulate its consumption of energy proportionally to the load.

As the type of engine shown in Fig. 1 has a special form of governor, I will describe the same by referring to Figs. 9, 10, 11, and 12. The disk 5 is fixed to the engine-shaft S, so as to rotate with it. Inside the disk are pivoted the two governor-weights W, which are held toward the shaft by the springs 25. To each of the weights W is pivoted arm 26, and the other ends of these arms are pivoted to lugs on the flange 27 of an eccentric, 28, which is arranged to rotate to a limited extent on the shaft S. Its rotary movement is effected by its connection with the weights W, as will be readily understood. Extending from the main bearing 29 is a pin, 30, which serves as a center for the trunnion-block 31, to which is pivoted at right angles the yoke 32, which opens out to a somewhat greater extent than the diameter of the eccentric 28, and at both ends of the horizontal diameter of the eccentric 28 the yoke 32 is provided with suitable bearing-blocks, 33, which, as shown in Fig. 9, bear against the eccentric surface. By this construction the yoke 32 is oscillated to the right and left in Fig. 9 by the direct action of the eccentric, and is free to oscillate in a direction at right angles to this motion on the trunnion-block 31, as will be seen by reference to Fig. 10. At the lower end the yoke 32 is provided with a pair of spring-jaws, 34, which embrace the governing-rod 35. This rod is at that portion formed with a ratchet on each side, the ratchets being of opposite character and the spring-jaws 34 being so shaped that one of them will, when engaged, grip and push the rod 35 in one direction, and the other, when engaged, will grip and push the rod 35 in the other direction. The engagement of one or the other of the jaws 34 is brought about by the oscillation of the yoke 32 in a direction parallel with the shaft S—that is, in a direction at right angles to the length of the rod 35, and the oscillation of the yoke 32 in a direction to propel the rod 35 in either direction is effected by means of the eccentric 28 and bearing-blocks 33. The oscillation of the yoke 32 in the direction lengthwise of the rod 35 takes place regularly and continuously, but the rod 35 is moved only in accordance with the requirements of the load by means of the weights W, springs 25, arms 26, and disk 27. The governing movement of disk 27 depends upon the position of the weights W in the following manner: In the face of the hub of disk 5 are two or more circular recesses, and on the adjacent faces of the disk 27 are corresponding recesses, the bottom surface of one set of these recesses being inclined, so as to partake of the character of a circular wedge, and in placing the disk 27 in its position I insert rollers 36. By this construction, then, the rotary movement imparted to the disk 27 by the weights W causes the rollers to rotate on the inclined surface of the recesses and to push the disk 27 to a greater or less extent away from its normal position with respect to the disk 5. In Fig. 10 this moves the yoke 32 somewhat to the right and a contrary motion moves it somewhat to the left, assisted in the latter by the spring 37. Therefore, the position of the weights W determines, from time to time, according to the load, the necessary engagement of the yoke 32 and its jaws 34 with the governing-rod 35. The latter extends back through suitable guides, and is pivoted to a transverse lever, 38, which extends under the cylinder and carries a forked wedge, 39, which embraces the stem of the valve which admits gas to the explosion-chamber of the engine, and according to the angular position of the wedge 39 the movement which is permitted to the valve is definitely limited between the extremes of no gas or only sufficient to overcome friction of the engine and keep the parts in motion, and that sufficient to cause the engine to exert its greatest power, and between these extremes every possible graduation is effected by the continuous rise of the wedge 39, so that the smallest movement of the rod 35 in either direction will have a direct effect on the quantity of gas which can be admitted for any given stroke of the engine. The action, therefore, is entirely automatic with respect to the consumption of gas, and owing to the dependence of the actions on the position of the weights W, which in turn depend upon the speed and therefore on the load, the consumption of gas is in proportion to the load.

As before stated, the plant thus far described is for the sole purpose of generating electrical energy, and the energy so generated is utilized directly for the propulsion of the vehicle to which the electric tender may be coupled or upon which it may be placed directly, as in some instances may be found necessary, and will be hereinafter more fully mentioned.

Referring now to Fig. 4, I arrange, preferably under the bed of the car 10, an electric motor, M, which is geared in a suitable manner to the front or rear axle of the car, or to both of them, as shown in the figure. The intention is to start the prime mover on beginning the trip and keep it in continuous operation throughout the trip, and under such circumstances the dynamo-electric generator D will be also kept in continuous rotation, and with the system of regulation which I will now set forth it will be desirable to keep the engine and dynamo at a constant speed. The generator D in this particular instance has a shunt-field, and the main conductors from the brushes are carried along in any suitable manner under or above the floor to the front or back platform of the car or to any suitable location, and connected with the motor and with the regulating and stopping and starting devices. This will be best understood by referring to Fig. 5, where I have diagrammatically shown the generator D, the motor M, and the circuits for controlling the power or speed of the motor and the starting and stopping or reversing of the same.

It will be observed that the mains are furnished with suitable coupling devices for convenience of disconnecting the generating-plant from the car. They pass direct to the terminals of the motor M, which is of the ordinary series-wound type. I provide the motor M with two pairs of brushes—one pair for going ahead and the other for going backward. These brushes may be to advantage carried on adjustable arms, so that each brush may be independently adjusted to the position of least spark on the commutator. Each brush is pivoted on its corresponding arm, and is provided with a projecting armature, 11, which is in operative proximity to an electro-magnet, 12, 13, 14, and 15, each of the said electro-magnets acting when energized to attract its own armature and lift the corresponding brush entirely away from the commutator. Thus arranged I connect up as follows: At a suitable point (preferably within reach of the person in charge of the car, whether it be the driver or the conductor) I locate a suitable rheostat, 16, having an adjusting-handle, 17, or other corresponding means of changing the amount of resistance introduced into the circuit. This rheostat is connected, as shown, in series with the shunt-field of the generator D, so that by moving the handle the amount of resistance introduced into the field-circuit of the generator can be graded at will.

At a convenient point near the rheostat I locate a switch, 18, whose shifting-lever is connected directly to one side of the main circuit and whose two contacts are connected in parallel to the other side of the main circuit, and each of such parallel circuits includes two of the electro-magnets, such electro-magnets being corresponding ones—that is, those diametrically opposite one another.

It will be readily understood from the foregoing that if the electro-magnets 12 and 13 are energized they immediately attract the armatures attached to their corresponding brushes and lift the latter off the commutator, and the same is true of the electro-magnets 14 and 15. The respective pairs of brushes are so connected into the main circuit that one pair will always have the effect of driving the motor 10 in one direction and the other pair will always drive it in the other direction, and the position of both pairs of brushes is entirely dependent upon the switch 18, so that the driver or person in charge by simply moving the switch can control the direction of motion of the motor. The switch 18 also serves as a substitute for a main-line switch to open the circuit, and at the same time avoids the necessity for an additional piece of mechanism to look after and operate, since, as will readily be understood, if the lever be set at the middle point, so as to bridge the two contacts of the switch, the result is that both pairs of electro-magnets 12 13 and 14 15 are energized, and all the brushes are lifted off the commutator, thereby opening the main circuit through the motor 10.

In order to prevent the failure of the current to energize the magnets after it has once been admitted to them, I prefer to arrange them as a shunt to the motor, whereby after the brushes have been lifted off and the main circuit broken there will still be a closed circuit of suitable resistance through the electro-magnets which operates the brushes, and this circuit will be alive so long as the switch-lever is in the middle position. The car will be started in one direction or the other according to which side of the middle position the switch-lever is moved to when it is desired to start.

I desire to state here that while I have shown and described a multipolar dynamo-electric machine and a multipolar motor I have done so merely because I prefer that form; but it is quite obvious that my invention can be carried into practical effect with any form or type of motor found capable of doing the work required of it. It will be noticed in Fig. 5 that I have utilized one of the mains as part of the circuit of the shunt-field of the electric generator; but of course there may be an independent connection for this purpose.

The operation of my invention as above set forth will be as follows: The gas-engine is first started before attempting to leave the station or terminus of the railway. For convenience of starting the gas-engine of each car before beginning its day's run, I prefer to locate a stationary dynamo at the terminus or car-house, and, having it in operation, I merely connect it momentarily by suitable cables or wires to the circuit of the generating-dynamos of the cars or tenders. The generating-dynamos of the cars at once act as motors and start into revolution, thus setting up the motion desired to get the gas-engine in operation. The gas-engine of the car can thus be started with great facility. After once starting, the gas-engine and generating-dynamo are run continuously all day, or for such time as the particular car in question may require before being housed for the night. Once the gas-engine and generating-dynamo are in normal revolution everything is in readiness for the starting of the car. Assuming that at the time of stopping the previous night the switch-lever had been left in middle position, the person in charge of the car will merely have to move the handle of the rheostat to the right first of all, so as to cut down the strength of the field-magnet and with it the potential of the main circuit. Having done this, it is only necessary to swing the switch-lever to the right. This at once throws down the brushes belonging to magnets 14 15, and the other two brushes remain up out of contact with the commutator, and the motor at once starts into operation in the direction to propel the car toward the right. As the car gains headway or becomes loaded or arrives at a grade, the handle of the rheostat will be moved to the left, so as to cut out resistance and increase the strength of the field-magnet of the generator and the motor at once responds with more power or more speed, as the case may be. When it becomes necessary to slow down the motor, this will be done by shifting the handle of the rheostat, and to stop the motor it is simply necessary to swing the switch-lever to its middle position, and if it becomes necessary to back the car this will be immediately accomplished by swinging the switch-lever to the left of its middle position, which would then set down the proper pair of brushes for that purpose on the commutator and lift the other pair.

The electric tender which carries the engine and dynamo-electric generator is not strictly the equivalent of the locomotive on steam-railways, because, although it carries the engine and the source of energy, it does not carry the devices for absorbing such energy and converting it into motion, as the electric motor is located on the car, and hence the car either pulls or pushes the electric tender. The tender with its generating-plant is comparatively light with respect to the car, and the traction of the latter increases in nearly direct proportion to the load placed upon it. In some cases, however, it may be desirable to have the entire structure in one, so as to be entirely self-contained, and in that event the construction will take the shape of what I have above termed a "dummy"—namely, a car having a motor attached or connected to its axle and the generating-plant arranged in a compartment in any suitable portion of the car, as indicated by Fig. 6.

For the transportation of trains such as are ordinarily carried on steam-railways, it is desirable to have something of very high power, and in that event I would construct and operate my invention after the plan indicated in Fig. 7. In this case there will be preferably two independent engines, respectively driving two or more independent dynamo-electric generators, and as such a vehicle or electric locomotive will generally have four axles, I prefer to attach to each axle a separate electric motor, and these can be connected with the dynamo-electric generators in any desired way by means of suitable switching devices, which may be constructed in a variety of forms within the knowledge of any skilled electrical engineer, and I therefore need not specifically describe them. This at once gives a great advantage. In an electric locomotive designed to be capable of developing four-hundred-horse power, I would use two or more engines and two or more dynamos of corresponding generative capacity. With the motors connected as described, under the ordinary conditions of level tracks or downgrade, one or more of the engines might be allowed to stop absolutely and with it its dynamo, and in this event I would arrange a circuit from each generator in such manner that when arriving at an upgrade, or when requiring more speed, I would utilize the current from the generator then running to start the other generator, in which case it would momentarily act as an electric motor and instantly start up the other gas-engine, and then the switch used for such purpose could be opened and each generator would contribute its full share of energy to its respective motors, with the desired result.

The foregoing system has several very important advantages which cannot be obtained with any system having a stationary generating-plant and supply conductors under ground or overhead. In either of the latter either a constant potential or a constant current must necessarily be supplied by the mains, and the electrical energy supplied to the motor can be varied to suit the conditions of load or speed and the motor saved from destruction only by the use of dead resistances, either outside the motor or within it, and the difference between the supplied and the utilized energy is wasted in heating these resistances. The consequence of this is that in existing overhead or conduit systems the average of efficiency is low. It is evident that maximum efficiency can be obtained only by regulating at the generator, and then only when the prime mover is capable of regulating its consumption of heat units. It will be seen that my system admits of a constantly-obtainable maximum efficiency whatever be the conditions of load or speed, since I regulate at the generator.

Another important advantage lies in my ability to use very low potentials and heavy currents, since the resistance of the mains is small it may be neglected; hence the brushes and commutator need not suffer; but perhaps the greatest gain is in my ability to obtain the necessary maximum of work with a very small consumption of electrical energy and a comparatively small engine. In starting from a position of rest an electric motor gives its maximum pull or torque when its iron is saturated, and any increase of electro-motive force will only heat the wire; but in a position of rest its resistance is at a minimum, and hence a low electro-motive force suffices to produce the maximum torque or rotary pull. The latter may be said to be governed by strength of current rather than electro-motive force. In existing distributing systems resistances must be introduced in the motor-circuit at the moment of starting. In my improved system they are banished entirely. As a very slight electro-motive force suffices to saturate the motor when at rest, I cut down the field of the generator correspondingly and still obtain the maximum torque in the motor; but no energy is wasted since it is not generated, and the fuel is conserved by the automatic government of the prime mover. As the car moves forward and speed is demanded, I increase the field-magnetism of the generator, thereby increasing the electro-motive force, the motor thus receiving more current, and the engine responds with more energy. To make this plainer and illustrate the coincident advantage obtainable by my arrangement, I will use some figures. Assuming that the heaviest consumption of energy will be that sufficient to start a full loaded car on an upgrade of ten per cent., or to maintain such a car at a maximum speed on a level track, it is safe to say that such energy will for an ordinary tram-car never exceed three thousand watts, or, say, four-horse power, actual energy at the motor. I use a gas-engine capable of delivering actually four-horse power to the shaft. I use a dynamo-electric machine which at maximum speed and saturated field will give an electro-motive force of say forty volts. Its armature resistance would be exceedingly low. Supposing its normal current to be seventy-five ampères at maximum electro-motive force, I construct the armature so as to have a capacity at saturation for, say, three hundred ampères, or four times its so-called "normal." The motor is likewise constructed as to current capacity at saturation, and I will suppose its resistance at rest to be 0.03 ohm. Now as the torque of the series-wound motor depends directly upon the current so long as saturation is not reached, the result is in the above instance very striking and effective. The car being stationary, loaded, and on an upgrade, requires, say, three-horse power to start it readily. With an ordinary motor series wound for a given current the torque cannot be increased effectively, and certainly not with any high degree of efficiency, and when at rest its traction effort upon the admission of current is very small indeed. In my case, however, bearing in mind the quality of regulation and the low resistance in the working-circuit, I reduce the field magnetism of the generator until the electro-motive force available at the motor is, for example, only ten volts, and then (leaving out of the calculation the resistance of the generator and lines, which is but a small fraction of the total resistance) the current in the motor will be about three hundred ampères, and the traction effort will be therefore normally increased and the car started readily without any fall in the percentage deficiency. When high speed with full load on a level is required, I increase the field magnetism of the generator to produce, say, forty volts, and then the current falls to seventy-five ampères (in the example given) on account of the opposing electro-motive force of the motor, while again the maximum power is developed; and between these two extremes of high speed and starting from rest the percentage of efficiency remains practically the same, and I am able to maintain the final or net efficiency of the combination at about eighty-five per cent.—a result I believe unattainable by any other system. The above remarkable difference between existing systems and mine may be briefly stated thus: While in all ordinary electric motors the traction effort falls with the speed of the motor, by my method of construction and arrangement the traction effort increases with reduction of speed of the motor. Further, since in most cases there will be but one motor and one motor forming its external circuit, both of low resistance and substantially no line-resistance, there will be a mutually-automatic regulation, due to reaction, for any given position of the rheostat. If the motor tends to increase its speed, the counter electro-motive force increases, reducing the current in the circuit, and hence slowing down the motor. The converse is equally true. The rheostat is used to compel such variations as will not be automatically produced.

I wish to state in reference to my description of available prime motors that I also consider as embraced within the general class an electric motor on a car, energized from an overhead or underground main or feeder and kept in continuous operation as the driver of a dynamo-electric generator, which in turn furnishes current to a separate motor, constituting the ultimate propelling agent of the car. Such a system is not so simple or perfect as my above-described preferred system, but still it would possess many of its advantages. I have in Fig. 8 diagrammatically illustrated such a plan, where $M^2$ is an electric motor constituting the prime mover. $D^2$ is the dynamo-electric generator; $M^3$, the electric motor of the car, and $L^2$ the connections adapted to travel in contact with the overhead mains or supply-circuit $S^2$.

I claim as my invention—

1. The combination of a prime mover provided with means for automatically regulating its consumption of energy proportionally to the load and dependent thereon and a dynamo-electric generator driven thereby and provided with means for varying its potential, both located on a moving vehicle, and an electric motor energized by said generator and constituting the propelling device for said vehicle.

2. The combination of a prime mover provided with means for automatically regulating its consumption of energy proportionally to the load and dependent thereon and a shunt-wound dynamo-electric generator driven thereby and provided with means for varying its potential, both located on a moving vehicle, and a series-wound electric motor energized by said generator and constituting the propelling device for said vehicle.

3. A wheeled vehicle or car carrying a prime mover and a dynamo-electric generator driven thereby, in combination with another vehicle having as its motive power an electric motor energized by said generator, said vehicles being coupled together in a suitable manner.

4. A wheeled vehicle or car carrying a prime mover and a dynamo-electric generator driven thereby, said generator being adapted for the regulation of its potential, in combination with another vehicle having as its motive power an electric motor energized by said generator, and means on the latter vehicle for regulating the potential of the said generator, both vehicles being coupled together in a suitable manner.

5. An electric locomotive comprising a wheeled vehicle carrying two independent prime movers, two independent dynamo-electric generators, respectively driven by said prime movers, and two or more electric motors constituting the immediate motive power of said vehicle, in combination with switching mechanism adapted to connect any motor with either of said dynamo-electric generators.

6. A wheeled vehicle or car carrying, first, a gas-engine provided with means for automatically regulating its consumption of energy proportionally to the load; secondly, means of supplying the same with gas or vapor, and, thirdly, a dynamo-electric generator having means of varying the strength of its field magnetism and driven by said gas-engine, in combination with an electric motor energized by said generator and constituting the propelling-power of said vehicle.

7. A wheeled vehicle or car carrying, first, a gas-engine; secondly, means of supplying the same with gas or vapor, and, thirdly, a dynamo-electric generator driven by said gas-engine, in combination with a second vehicle or car carrying an electric motor energized by said generator and constituting the motive power, both vehicles being coupled together.

8. A wheeled vehicle or car carrying a gas-engine, provided with means for automatically regulating its consumption of energy proportionally to the load and dependent thereon, means for supplying the same with gas or vapor, and a dynamo-electric generator driven by said gas-engine, and having means of varying the strength of its field magnetism, both engine and generator being maintained in continuous rotation while in transit, in combination with an electric motor energized by said generator and constituting the propelling-power of said vehicle, and suitable connections for closing the circuit of the dynamo through the motor at will.

9. An electric locomotive comprising a wheeled vehicle carrying two or more independent gas-engines, a gas-supply therefor, and two or more independent dynamo-electric generators, respectively driven by said gas-engine, and two or more electric motors constituting the immediate motive power of the locomotive, and arranged in combination with switching devices adapted to connect any motor with either generator and transfer one generator as motor into the circuit of the other generator for the purpose of starting its engine.

10. In a plant for the generation and utilization of electrical energy, the combination of a prime mover, a dynamo-electric generator, and an electric motor energized thereby, both said dynamo-electric generator and motor having each a dynamic capacity in excess of that of the prime mover, whereby the maximum effort of the prime mover may be exerted either in tractive force or speed on the part of the electric motor.

In testimony whereof I affix my signature in presence of two witnesses.

CHARLES S. BRADLEY.

Witnesses:
 T. J. McTIGHE,
 CHAS. W. PRICE.